Jan. 18, 1944. N. E. WAHLBERG ET AL 2,339,533
AUTOMOTIVE SUSPENSION
Filed Feb. 6, 1942
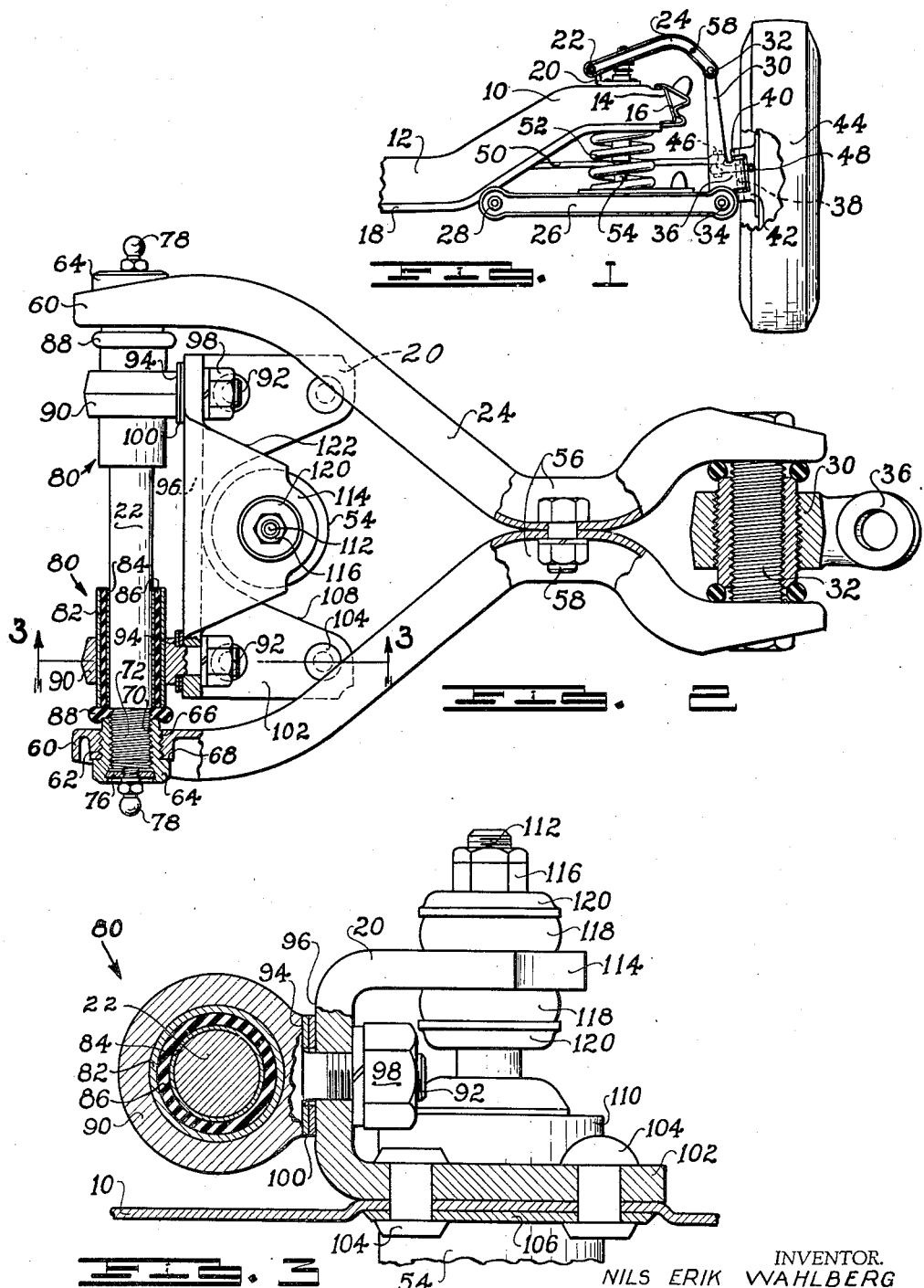
INVENTOR.
NILS ERIK WAHLBERG
ROSS H. PHELPS
BY Carl J. Barbee
THEIR ATTORNEY Patented Jan. 18, 1944

2,339,533

UNITED STATES PATENT OFFICE 2,339,533

AUTOMOTIVE SUSPENSION

Nils Erik Wahlberg, Chicago, Ill., and Ross H. Phelps, Kenosha, Wis., assignors to Nash-Kelvinator Corporation, Kenosha, Wis., a corporation of Maryland Application February 6, 1942, Serial No. 429,706

6 Claims. (Cl. 267—20)

This invention relates to automotive wheel suspensions and has particular reference to means for mounting the pivot bar of the upper control arm of a parallel arm type of wheel suspension on the frame of a vehicle.

It is an object of this invention to provide means for mounting a control arm pivot bar in such a way that the friction load ordinarily encountered in initially moving a control arm supported by the pivot bar is to a great extent eliminated.

It is another object of this invention to provide means for mounting a control arm pivot bar on the frame of a vehicle in such a manner that the arm and pivot bar will be insulated from the frame to prevent the transmission of vibrations therebetween.

It is another object of this invention to provide an insulating bushing for mounting a pivot bar on a vehicle.

It is another object of this invention to provide a pivot bar for a control arm, which pivot bar will rotate slightly relative to the vehicle on which it is mounted.

Other objects and advantages of this invention will be apparent from a consideration of the following description and claims and the attached drawing, of which there is one sheet, and in which—

Figure 1 represents a front elevation of a parallel arm type of wheel suspension as attached to the frame of an automobile;

Figure 2 represents a plan view, partially broken away, of the upper control arm and pivot bar shown in Figure 1; and Figure 3 represents a sectional view taken along a plane indicated by the line 3—3 in Figure 2 and looking in the direction of the arrows.

The general relationship between the various parts of the wheel suspension system is illustrated in Figure 1. The construction on each side of the vehicle being the same, only one side is shown. The frame of the automobile has a front cross member 10 which is bent downwardly at 12 intermediate the ends thereof, the ends 14 being nested between the flanges of generally channel shaped side rails 16. The cross member 10 is generally channel shaped in cross section and opens downwardly, having flanges 18 turned outwardly from its channel section along the lower edges thereof. A bracket 20 is secured to the top surface of the cross member 10 near each end thereof. The bracket supports a pivot bar 22 and an upper control arm 24. A lower control arm 26 has its inner end pivotally supported at 28 to the underside of the cross member 10 and extends generally horizontally outwardly beyond the side rail 16. A steering knuckle support arm 30 has its upper end pivotally connected to the outer end of the upper control arm 24 as at 32 while its lower end is pivotally connected to the outer end of the lower control arm 26 as at 34. A boss 36 formed on the outer side of the support arm 30 is apertured to support the generally vertical king pin 38 upon which the yoke arms 40 of a steering knuckle 42 are rotatably mounted. The steering knuckle 42 is provided with a spindle section on which is mounted the road wheel 44 and with a steering knuckle arm 46 which is secured to the steering knuckle by any suitable means, such as the nut 48. The steering knuckle arm 46 is connected to suitable steering linkage 50 by means of which the steering knuckle 42 and steering knuckle arm 46 may be rotated about the axis of the king pin 38.

A coil spring 52 is positioned between the lower control arm 26 and the underside of the channel shaped cross member 10 to cushion movement of the wheel 44 and control arms 24 and 26 relative to the cross member 10. A strut type shock absorber 54 is positioned telescopically within the spring 52 and extends from the lower control arm 26 upwardly through an aperture in the top wall of the cross member 10 to the bracket 20.

More specifically, the upper control arm 24 consists of a pair of generally channel shaped bars 56 which are positioned back to back with their webs secured together intermediate the ends thereof by a bolt 58. The outer ends of the bars 56 are bent into spaced parallel relationship so that the upper end of the support arm 30 may be positioned therebetween and so that the pivot 32 may be connected between the spaced ends and the upper end of the support arm. The inner ends of the bars 56 are also bent away from each other to form the spaced parallel end portions 60, the webs of which are extruded outwardly and internally threaded as at 62. Bushings 64 having external threads 66 and shoulders 68 are securely pressed into the internal threads of the extruded portions 62 until the shoulders 68 abut against the ends of the extruded portions. The bushings 64 are provided with internally threaded apertures 70 in which the threaded ends 72 of the pivot bar 22 are received. Plugs 76 in which are mounted grease fittings 78 are positioned in the ends of the apertures 70 to prevent dust and moisture from reaching the threads within the bushings.

Positioned around the pivot bar 22 adjacent to each end thereof and just inside of the ends 60 of the bars 56 are a pair of bushings generally indicated at 80. The bushings 80 each consist of an outer sleeve 82 and an inner sleeve 84 which are spaced from each other by a layer 86 of deformable material such as rubber. The rubber 86 may be positioned between the sleeves 82 and 84 by bonding to the surfaces of the sleeves or by stretching a tube of rubber over the surface of one of the sleeves until the wall thickness of the rubber is reduced to a point where the other sleeve may be slid in place and then releasing the tension on the rubber tube and permitting the wall to expand into tight contact with each of the sleeves. A sealing ring 88 of rubber is positioned between the outer ends of the bushings 80 and the inner ends of the bushings 64 to prevent dust and moisture from reaching the threaded ends 72 of the pivot bar.

The inner sleeves 84 of the bushings 80 are press fitted about the pivot bar 22. The bushings 80 are supported by the eye members 90 which are press fitted around the outer sleeves 82. The eyes 90 are provided with projecting bolt portions 92 which may be formed integrally therewith.

The bolts 92 are shouldered as at 94 and extend through apertures formed in the side wall 96 of the bracket 20 which is generally C-shaped in cross section. Nuts 98 threaded on the ends of the bolts 92 secure the eyes 90 to the side wall 96. Spacing gaskets 100 are positioned around the bolts 92 and between the shoulders 94 and the side wall 96. The thickness of the gaskets 100 may be varied to change the position of the pivot bar 22 and upper control arm 24 relative to the frame of the automobile. It will be noted that changing the position of the pivot bar will change the caster and camber adjustment of the king pin 40 in the manner which is more particularly described and claimed in the co-pending application of Ross H. Phelps for Automotive suspension, Serial No. 335,988, filed May 18, 1940.

The bracket 20 has its lower wall 102 secured to the top wall of the cross member 10 by means of the rivets 104. A reinforcing plate 106 may be provided on the underside of the cross member 10 and between the lower heads of the rivets 104 and the cross member. The lower wall 102 of the bracket 20 is notched in the center as at 108 to pass the upper end 110 of the strut type shock absorber 54. The upper end of the shock absorber is provided with a bayonet end 112 which extends through an aperture in the upper wall 114 of the bracket 20 and is secured thereto by means of the nut 116. Deformable gaskets 118 positioned on each side of the upper wall 114 and around the bayonet end 112 insulate the upper end of the shock absorber from the bracket. Cup shaped metallic washers 120 are provided to prevent abrasion of the gaskets 118. It will be noted that the upper wall 114 of the bracket 20 is tapered as at 122 so as to uncover the heads of the rivets 104 and so that a series of blanks for forming the brackets may be stamped from a piece of material without waste. The construction of the bracket 20 is more particularly described and claimed in the co-pending application of Ross H. Phelps for Automotive suspension, Serial No. 345,575, filed July 15, 1940.

From the above description it should be apparent that as the wheel 44 passes over uneven ground causing the steering knuckle support arm 30 to rise and fall, the upper control arm 24 will be caused to pivot about the axis of the pivot bar 22. The threaded connection between the bushings 64 and the ends of the pivot bar being relatively tight, this rotation will first cause the pivot bar to rotate slightly within the bushings 80 by reason of the flexing in the layer of rubber 86. After the first initial movement of the arm 24, further rotation thereof will be accommodated by rotation of the threaded ends 72 of the pivot bar 22 in the bushings 64. As a result, the only restraint against initial vertical movement of the wheel 44 relative to the frame of the vehicle occurs in the spring 52, shock absorber 54 and rubber 86 which can be readily calculated and designed to give any degree of softness desired. The structure eliminates the necessity of overcoming the high initial friction forces which occurred in prior structures between the threaded ends 72 of the pivot bar and the bushings 64 during the initial vertical movement of the wheel, which friction loads were hard to calculate and further were not constant, thus producing uneven springing qualities. In the present structure, the breakaway friction between the pivot bar 22 and bushings 64 occurs after the wheel has started to move and is therefore not objectionable. The bushings 80 also form sound deadening insulators between the control arm and the frame and reduce the amount of road noise that is transmitted to the body of the automobile.

While the bushings are disclosed as being applied to the upper control arm pivot bar only, it should be obvious that they may also be applied to the pivot which supports the lower control arm 26 or to the pivots 32 and 34 at the ends of the steering knuckle control arm.

The present disclosure is meant to be an example only and not as a limitation of our invention, to which we make the following claims.

We claim:

1. In combination with a control arm, a pivot bar, a support, an outer sleeve positioned around said pivot bar and secured to said support, an inner sleeve positioned about said pivot bar and within said outer sleeve, and a layer of deformable material positioned between said sleeves, said control arm being rotatably secured to said pivot bar.

2. In an automotive wheel suspension, a control arm having spaced end portions, bushings secured on said ends and defining aligned internally threaded apertures, a pivot bar having threaded ends received in said bushings, other bushings positioned around said pivot bar adjacent to the threaded ends thereof, said other bushings comprising inner and outer sleeves spaced from each other by deformable material, and deformable gaskets positioned around the threaded ends of said pivot bar between the adjacent ends of said first bushings and said other bushings.

3. In combination with an automobile having a frame member, a wheel suspension comprising a control arm, a pivot bar rotatably secured to one end of said control arm, a bracket secured to said frame member, eye members having bolt portions extending therefrom and secured to said bracket, said eye members encircling said pivot bar, and bushings positioned between said eye members and said pivot bar, said bushings including inner and outer sleeves spaced from each other by deformable material.

4. In combination with an automobile having a frame member, a wheel suspension comprising a bracket secured to said frame member, eye members secured to said bracket, sleeves press fitted within said eye members, other sleeves positioned telescopically within said first sleeves and separated therefrom by deformable material, a pivot bar press fitted within said other sleeves, and a control arm having one end rotatably secured to said pivot bar.

5. In an automobile having a frame member, a wheel suspension comprising a bracket secured to said frame member, spaced bushings secured to said bracket, a pivot bar supported within said bushings, said bushings serving to insulate said pivot bar from said bracket and permit limited rotation therebetween, and a control arm having one end rotatably secured to the ends of said pivot bar.

6. In an automotive wheel suspension of the parallel arm type, a fixed bracket, eye members having bolt portions extending through said bracket, spacer members positioned around said eye portions and between said bracket and said eye members, sleeves press fitted within said eye members, other sleeves positioned telescopically within said first sleeves and spaced therefrom by deformable material, a pivot bar press fitted within said other sleeves, threads formed on the ends of said pivot bar, internally threaded bushings threaded on the ends of said pivot bar, and a control arm having a divided end, said divided end being secured to said bushings.

NILS ERIK WAHLBERG.
ROSS H. PHELPS.